US012715255B2

(12) United States Patent
Shen et al.

(10) Patent No.: US 12,715,255 B2
(45) Date of Patent: Aug. 25, 2026

(54) METHOD TO DETECT A TRAILER COUPLER POSITION USING CAMERA-BASED TRIANGULATION, OPTIMIZATION AND FILTERING

(71) Applicant: GM GLOBAL TECHNOLOGY OPERATIONS LLC, Detroit, MI (US)

(72) Inventors: Jiabin Shen, Burnaby (CA); Bo Yu, Troy, MI (US); Kenneth Weber, Ajax (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 382 days.

(21) Appl. No.: 18/491,262

(22) Filed: Oct. 20, 2023

(65) Prior Publication Data

US 2025/0128553 A1 Apr. 24, 2025

(51) Int. Cl.

| | |
|---|---|
| ***B60D 1/00*** | (2006.01) |
| ***B60D 1/36*** | (2006.01) |
| ***B60W 30/00*** | (2006.01) |
| ***B60W 30/18*** | (2012.01) |
| ***B62D 15/02*** | (2006.01) |
| ***G06T 7/00*** | (2017.01) |
| ***G06T 7/20*** | (2017.01) |
| ***G06T 7/50*** | (2017.01) |
| ***G06T 7/70*** | (2017.01) |

(52) U.S. Cl.

CPC ......... *B60D 1/36* (2013.01); *B60W 30/18036* (2013.01); *B62D 15/025* (2013.01); *G06T 7/20* (2013.01); *G06T 7/50* (2017.01); *G06T 7/70* (2017.01); *B60W 2420/403* (2013.01); *G06T 2207/30252* (2013.01)

(58) Field of Classification Search

CPC .... B60D 1/36; G06T 7/50; G06T 7/70; G06T 7/20; G06T 2207/30252; B60W 30/18036; B60W 2420/403; B62D 15/025

USPC ............................................................ 701/25

See application file for complete search history.

(56) References Cited

U.S. PATENT DOCUMENTS

| | | | | |
|---|---|---|---|---|
| 2005/0074143 | A1* | 4/2005 | Kawai ...................... | B60D 1/62 382/104 |
| 2018/0272941 | A1* | 9/2018 | Bliss ........................ | B60D 1/36 |
| 2020/0238912 | A1* | 7/2020 | Sakakibara ............... | B60R 1/28 |

(Continued)

FOREIGN PATENT DOCUMENTS

| | | | |
|---|---|---|---|
| DE | 102014223141 | A1 | 5/2016 |
| DE | 102019129196 | A1 | 4/2020 |

(Continued)

OTHER PUBLICATIONS

German Office Action from counterpart DE1020231356801, dated Jan. 13, 2025.

*Primary Examiner* — Tiffany P Young

(57) ABSTRACT

A method of detecting and utilizing a 3-dimensional (3D) position of a coupler of a trailer may include calculating a motion of a camera mounted to a vehicle; determining 2-dimensional (2D) positions of the coupler within input images captured by the camera; estimating 3D estimated positions of the coupler based on the 2D positions of the coupler and the motion of the camera; optimizing the 3D estimated positions of the coupler to generate adjusted 3D coupler positions; and filtering the adjusted 3D coupler positions to detect the 3D position of the coupler of the trailer.

20 Claims, 12 Drawing Sheets

(56) References Cited

U.S. PATENT DOCUMENTS

2021/0155238 A1* 5/2021 Yu ........................... B60D 1/62
2023/0194290 A1* 6/2023 Yan .......................... G06T 7/73
701/410

FOREIGN PATENT DOCUMENTS

WO WO-2019213306 A1 11/2019
WO WO-2021108802 A1 6/2021

* cited by examiner

METHOD TO DETECT A TRAILER COUPLER POSITION USING CAMERA-BASED TRIANGULATION, OPTIMIZATION AND FILTERING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to a method to detect a position of a coupler of a trailer, a device, and a computer readable medium configured to perform the same.

Vehicles include one or more torque producing devices, such as an internal combustion engine and/or an electric motor. A passenger of a vehicle rides within a passenger cabin (or passenger compartment) of the vehicle.

Vehicles may include one or more different types of sensors that sense vehicle surroundings. One example of a sensor that senses vehicle surroundings is a camera configured to capture images of the vehicle surroundings. Examples of such cameras include forward-facing cameras, rear-facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

A vehicle may include a trailer hitch that is mounted to a structural portion of the vehicle, such as the chassis/frame of the vehicle. The trailer hitch allows the vehicle to tow various types of trailers and trailered items by connecting the trailer hitch of the vehicle to a coupler of the trailer. For example, the vehicle may tow a boat on a boat trailer, a travel trailer, one or more bicycles, utility vehicles, off road vehicles (ORVs), etc.

Driver assistance systems have been developed to use the sensors of a vehicle to assist an operator (or, alternatively, a driver) of a vehicle in towing a trailer. However, such systems may not assist the operator of the vehicle with coupling of the trailer hitch of the vehicle to the coupler of the trailer.

SUMMARY

At least some example embodiments relate to a method of detecting and utilizing a 3-dimensional (3D) position of a coupler of a trailer.

In some example embodiments, the method includes calculating a motion of a camera mounted to a vehicle; determining 2-dimensional (2D) positions of the coupler within input images captured by the camera; estimating 3D estimated positions of the coupler based on the 2D positions of the coupler and the motion of the camera; optimizing the 3D estimated positions of the coupler to generate adjusted 3D coupler positions; and filtering the adjusted 3D coupler positions to detect the 3D position of the coupler of the trailer.

In some example embodiments, the method further includes receiving a plurality of the input images captured by the camera; and detecting whether the coupler is present in one or more of the plurality of the input images, wherein the determining the 2D positions of the coupler is performed in response to detecting that the coupler is present in one or more of the plurality of the input images.

In some example embodiments, the detecting whether the coupler is present includes performing object detection on each of the plurality of the input images using trained machine learning or deep learning models.

In some example embodiments, the method further includes performing supervised machine learning to generate the trained machine learning or deep learning models by iteratively applying a plurality of labeled test images having ground truth values indicating a presence of the coupler of the trailer or an absence of the coupler of the trailer to the models to reduce an error between an output of a neural network and the ground truth values of the plurality of labeled test images.

In some example embodiments, the estimating the 3D estimated positions of the coupler includes triangulating the 2D positions of the coupler in a plurality of the input images captured by the camera mounted to the vehicle to estimate the 3D estimated positions of the coupler.

In some example embodiments, the triangulating includes calculating a first depth value extending between one of the 3D estimated positions of the coupler and a focal point of the camera with respect to a first one of the plurality of the images, calculating a second depth value extending between the one of the 3D estimated positions of the coupler and a focal point of the camera with respect to a second one of the plurality of the image images, and estimating the one of the 3D estimated positions of the coupler by performing triangulation using the first depth value and the second depth value in a 3D space.

In some example embodiments, the optimizing includes reprojecting the 3D estimated positions of the coupler back onto respective ones of the input images to determine reprojected 2D positions; determining reprojection errors between ones of the 2-dimensional (2D) positions of the coupler within the respective ones of the input images and respective ones of the reprojected 2D positions; and adjusting the 3D estimated positions of the coupler to reduce a sum of the reprojection errors.

In some example embodiments, the filtering includes averaging the adjusted 3D coupler positions to generate an average 3D coupler position; removing ones of the adjusted 3D coupler positions outside a defined radius from the average 3D coupler position to generate remaining adjusted 3D coupler positions; and averaging the remaining adjusted 3D coupler positions to determine a final 3D coupler position.

In some example embodiments, the method further includes guiding the vehicle based on at least the 3D position of the coupler such that a hitch ball of the vehicle approaches the coupler of the trailer.

In some example embodiments, the guiding includes controlling a graphical user interface (GUI) to output a display to an operator of the vehicle illustrating at least a relative position between the hitch ball of the vehicle and the coupler of the trailer based on the 3D position of the coupler.

In some example embodiments, the controlling the GUI further includes adjusting one or more of an angle, a length and a color of a virtual guideline extending between the hitch ball of the vehicle and the coupler of the trailer as the relative position between the hitch ball of the vehicle and the coupler of the trailer varies.

In some example embodiments, the guiding includes detecting a height of the coupler of the trailer based on the 3D position of the coupler; determining whether the height of the coupler corresponds to a height of the hitch ball of the vehicle; and indicating to the operator of the vehicle to adjust the height of the coupler, in response to the height of the coupler not corresponding to the height of the hitch ball of the vehicle.

In some example embodiments, the guiding includes electronically repositioning the vehicle such that the hitch ball of the vehicle approaches the coupler of the trailer based on the 3D position of the coupler.

In some example embodiments, the electrically repositioning includes controlling one or more of steering and brakes of the vehicle while the vehicle is driven in reverse towards the coupler.

In some example embodiments, the electrically repositioning further includes instructing the vehicle control system to drive the vehicle in reverse towards the coupler of the trailer based on the 3D position of the coupler while controlling the one or more of the steering and brakes of the vehicle.

Other example embodiments relate to an electronic device.

In some example embodiments, the electronic device includes a memory; and processing circuitry configured to detect and utilize a 3-dimensional (3D) position of a coupler of a trailer by, calculating a motion of a camera mounted to a vehicle, determining 2-dimensional (2D) positions of the coupler within input images captured by the camera, estimating 3D estimated positions of the coupler based on the 2D positions of the coupler and the motion of the camera, optimizing the 3D estimated positions of the coupler to generate adjusted 3D coupler positions, and filtering the adjusted 3D coupler positions to detect the 3D position of the coupler.

In some example embodiments, the processing circuitry is configured to estimate the 3D estimated positions of the coupler by triangulating the 2D positions of the coupler in a plurality of the input images captured by the camera mounted to the vehicle to estimate the 3D estimated positions of the coupler.

In some example embodiments, the processing circuitry is configured to optimize the 3D estimated positions by, reprojecting the 3D estimated positions of the coupler back onto respective ones of the input images to determine reprojected 2D positions, determining reprojection errors between ones of the 2-dimensional (2D) positions of the coupler within the respective ones of the input images and respective ones of the reprojected 2D positions, and adjusting the 3D estimated positions of the coupler to reduce a sum of the reprojection errors.

In some example embodiments, the processing circuitry is configured to filter the adjusted 3D coupler positions by, averaging the adjusted 3D coupler positions to generate an average 3D coupler position, removing ones of the adjusted 3D coupler positions outside a defined radius from the average 3D coupler position to generate remaining adjusted 3D coupler positions, and averaging the remaining adjusted 3D coupler positions to determine a final 3D coupler position.

In some example embodiments, the electric device is an electronic control unit (ECU) or a vehicle control unit (VCU).

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Various types of vehicles can be used to tow trailers, such as cars, hatchbacks, utility vehicles, trucks, etc. A vehicle may include a trailer hitch, mounted to the structure of the vehicle. A towing drawbar may be inserted into the hitch, and a ball can be affixed to the end of this drawbar to enable the attachment of a coupler of a trailer for towing by the vehicle.

The present application involves detecting the trailer coupler position. The position of the trailer coupler can be used to assist the operator in attaching the trailer hitch (e.g. the ball of the trailer hitch) to the coupler of the trailer.

Figure 1:
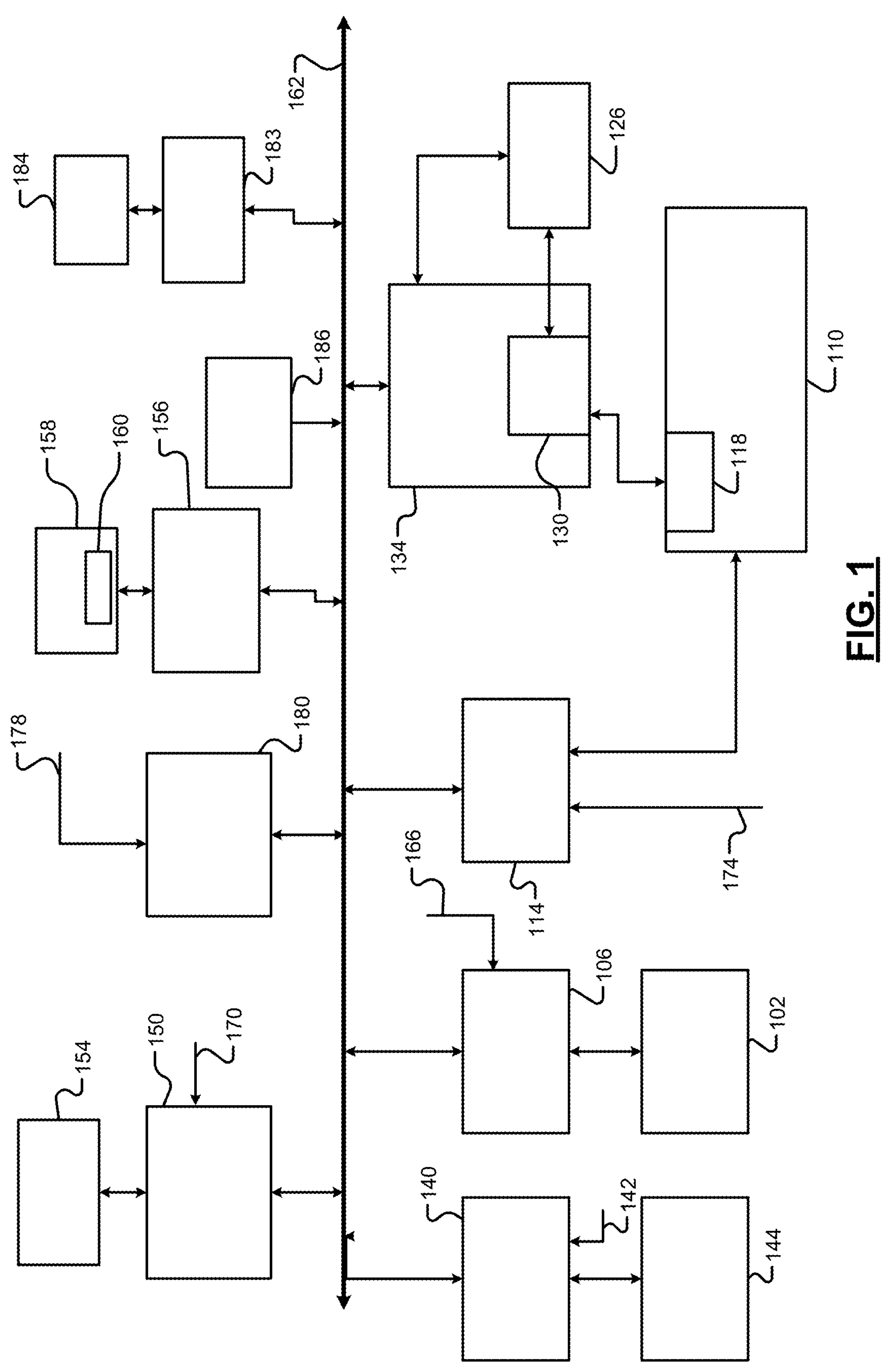
FIG. 1 illustrates a functional block diagram of a vehicle system according to some example embodiments.

FIG. 1 illustrates a functional block diagram of a vehicle system according to some example embodiments.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. A damper control module 156 controls damping of dampers 158 of the wheels, respectively, of the vehicle. The dampers 158 damp vertical motion of the wheels. The damper control module 156 may control, for example, damping coefficients of the dampers 158, respectively. For example, the dampers 158 may include magnetorheological dampers, continuous damping control dampers, or another suitable type of adjustable damper. The dampers 158 include actuators 160 that adjust damping of the dampers 158, respectively. In the example of magnetorheological dampers, the actuators 160 may adjust magnetic fields applied to magnetorheological fluid within the dampers 158, respectively, to adjust damping.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras 186. One or more actions may be taken based on input from the external sensors and cameras 186. For example, the infotainment module 183 may display video, various views, and/or alerts on a display via input from the external sensors and cameras 186 during driving. The cameras 186 may include a rear facing camera.

A trailer hitch and ball can be fixed to the vehicle, such as via bolts to a frame, to accommodate the mounting of a trailer coupler onto the vehicle ball. The rear facing camera 186 may be configured to capture image frames of a trailer including a coupler of the trailer as the trailer hitch and ball of the vehicle is being coupled to the trailer.

The vehicle may include one or more additional control modules that are not shown, such as a chassis control module, a battery pack control module, etc. The vehicle may omit one or more of the control modules shown and discussed. Also, the vehicle may include one or more other types of sensors.

Figure 2:
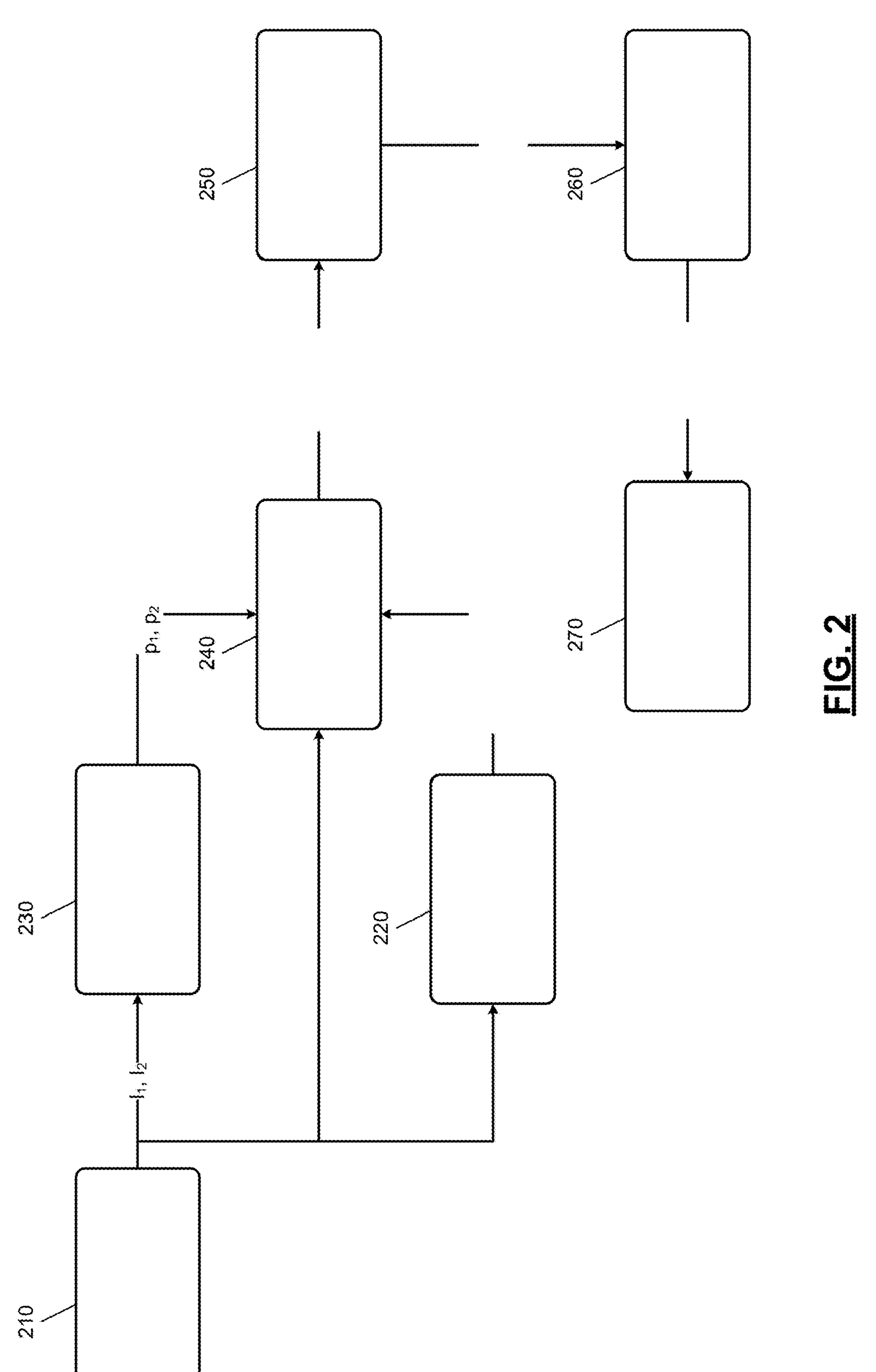
FIG. 2 is a diagram of a functional control system for detecting trailer coupler position according to example embodiments.
Figure 3:
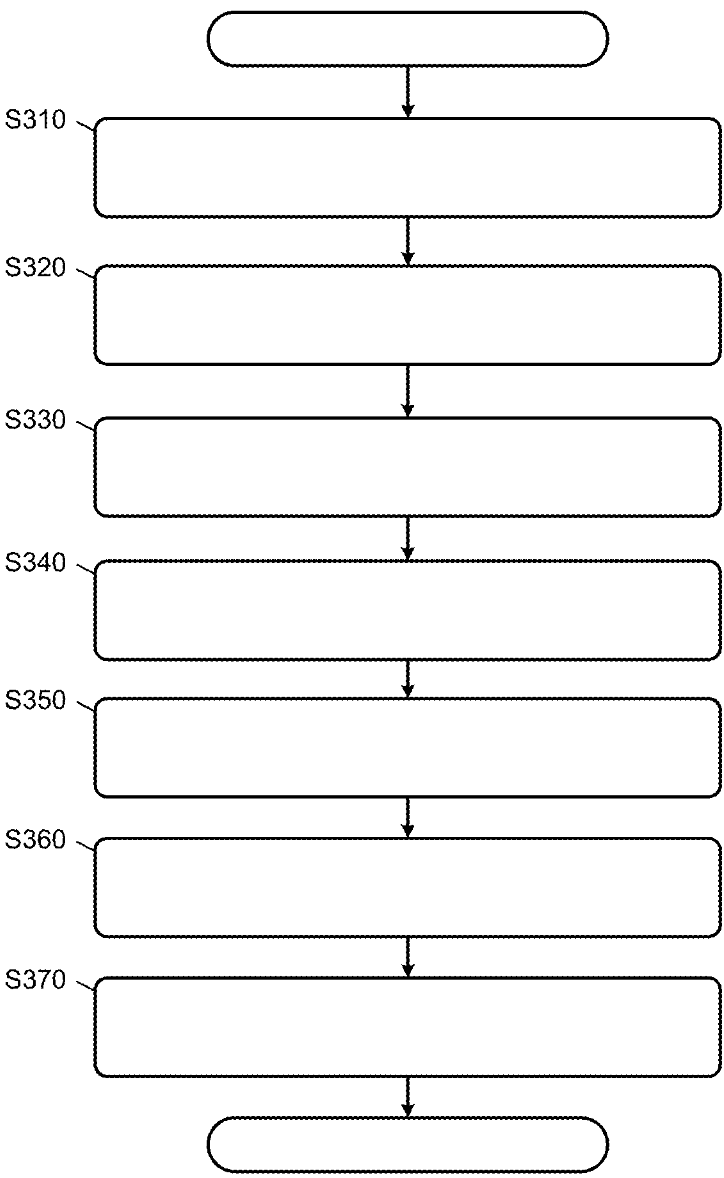
FIG. 3 is a diagram of a method of detecting trailer coupler position according to some example embodiments.

FIG. 2 is a diagram of a functional control system for detecting trailer coupler position according to example embodiments, and FIG. 3 is a diagram of a method of detecting trailer coupler position according to some example embodiments.

Referring to FIGS. 2 and 3, the method for detecting trailer coupler position may be initiated by, for example, manually by an operator of a vehicle selecting hitch assistance on a infotainment module, or may be initiated automatically when the vehicle is set to reverse.

In operation S310, an image feed generator 210 may continually receive image frames $I_1$-$I_n$ upon initiating the method. For example, the image feed generator 210 may receive and buffer images from the camera 186 mounted to the rear of the vehicle. The image frames provided by the image feed generator 210 may include pairs of consecutive image frames $I_1$ and $I_2$.

In operation S320, a camera location calculator 220 may analyze the image frames $I_1$ and $I_2$ and calculate a 3-dimensional (3D) location of the camera to determine a camera translation t and a camera rotation R. For example, the camera translation t and camera rotation R may be obtained from vehicle movements or a simultaneous localization and mapping technique.

In operation S330, a coupler position estimator 230 may determine a 2-dimensional (2D) position $p_1$, $p_2$ of the trailer coupler within an image provided by a camera. For example, the coupler position estimator 230 may perform object detection on the images frames $I_1$ and $I_2$ to extract 2-dimensional (2D) positions $p_1$, $p_2$ of the trailer coupler in respective ones of the image frames $I_1$ and $I_2$. The 2D position $p_1$, $p_2$ of the trailer coupler may be one or more pixel coordinates of the trailer coupler in respective ones of the image frames $I_1$ and $I_2$. For example, the pixel position of the center of the trailer coupler in vertical and horizontal axis.

The object detection may be implemented through the machine learning or deep learning approach, for example, a supervised machine learning approach. In general, a machine learning or deep learning model is trained offline, during which a number of trailer coupler pictures having a labeled coupler position in the images are used to train the model iteratively. While dependent on the exact architecture chosen, generally a neural network consists of multiple layers, each connected to components, known as neurons, within the following layer. During training, the placement and strength of these logic-forming connections are adjusted based on an error between the output of the neural network in training when compared to the ground truth values corresponding to the image tested. In this application, the network would initially see a discrepancy between the estimated 2D pixel coordinate(s) of the trailer coupler, and the correct, ground truth values supplied with the test image. After the appropriate iterations of training, the model can identify the coupler position in a given image with high accuracy. Then, the trained model is adopted to recognize the coupler.

In operation S340, a 3D coupler position estimator 240 may estimate a 3D position of the coupler P from the image frames $I_1$ and $I_2$, the 2D coupler position $p_1$, $p_2$, and the camera translation t and the camera rotation R. The 3D estimation of operation S340 will be discussed in more detail below with reference to FIGS. 4 and 5.

In operation S350, an optimization module 250 may perform optimization on the estimated 3D coupler positions P to reduce reprojection errors therein to generate optimized 3D coupler positions P'. The optimization of operation S350 will be discussed in more detail below with reference to FIGS. 6 and 7.

In operation S360, a filtering module 260 may filter the optimized 3D coupler positions P' to generate a final 3D coupler position Pf. The filtering of operation S360 will be discussed in more detail below with reference to FIGS. 8 and 9.

In operation S370, in some example embodiments, as discussed below with reference to FIG. 11, a hitch guidance or auto-hitching module 270 may guide an operator of the vehicle to approach the final 3D coupler position Pf. In other example embodiments, as discussed below with reference to FIG. 12, the hitch guidance or auto-hitching module 270 may automatically control the vehicle to approach the final 3D coupler position Pf. However, example embodiments are not limited thereto, and the vehicle may perform other functions based on the final 2D coupler position Pf.

The modules described with reference to FIG. 2 may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

The processing circuitry may execute program code (e.g., computer readable instructions) and data from a memory thereby converting the processing circuitry into a special purpose processor to perform the functions of the above-mentioned modules. Further, while the above functions are described using the above-mentioned modules to increase the clarity of the description, the processing circuitry is not intended to be limited to these functional units. For example, in one or more example embodiments, the various operations and/or functions of the functional units may be performed by other ones of the functional units. Further, the processing circuitry may perform the operations and/or functions of the various functional units without sub-dividing the operations and/or functions of the computer processing units into these various functional units.

Figure 4:
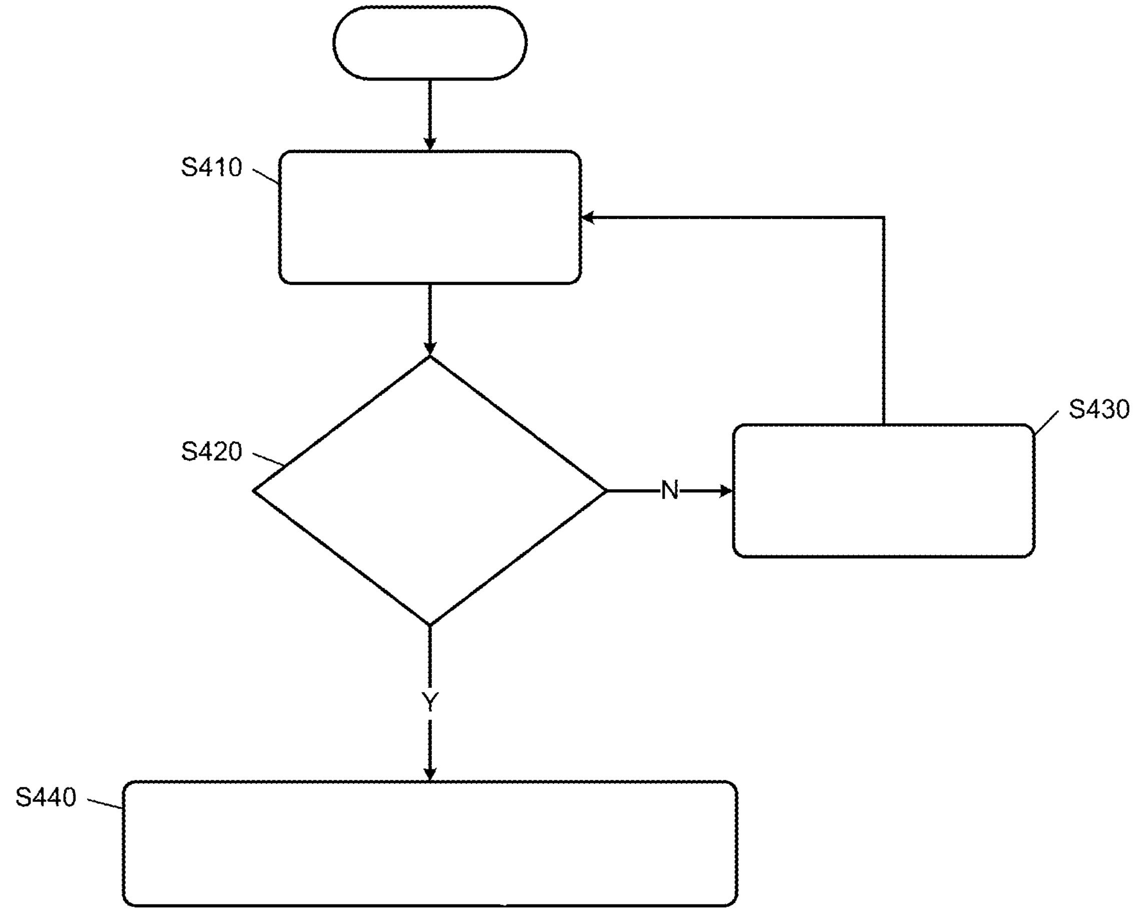
FIG. 4 is a diagram of a method of estimating a 3D coupler position based on triangulation according to some example embodiments.

FIG. 4 is a diagram of a method of estimating a 3D coupler position based on triangulation according to some example embodiments.

Referring to FIG. 4, in operation S410, the 3D coupler position estimator 240 may receive an input image frame I from the image feed generator 210.

In operation S420, the 3D coupler position estimator 240 may determine whether a reference frame exists. For example, the 3D coupler position estimator 240 may determine whether a prior image frame is stored within a buffer. The buffer may be included in a memory included in a control module of the vehicle.

In operation S430, if the reference frame does not exist, the 3D coupler position estimator 240 may define the received image frame I as a reference image frame $I_1$ and wait until a next image frame is received.

In operation S440, if the reference frame does already exist, the 3D coupler position estimator 240 may receive the 2D position of the trailer coupler $p_1$, $p_2$ from the reference image $I_1$ and the next image frame 12. For example, the 3D coupler position estimator 240 may receive the two consecutive image frames $I_1$ and $I_2$ received in operation S310, the rotation and translation R, t of the camera determined in operation S320, and the 2D coupler position $p_1$, $p_2$ determined in operation S330, and may determine the 3D position of the trailer coupler by performing triangulation using the above-identified data. More specifically, the 3D coupler position estimator 240 may determine the 3D coupler position by calculating the depth of the 2D position of the trailer coupler either $p_1$ or $p_2$, given the images $I_1$ and $I_2$ viewing the same trailer coupler from two known positions.

Figure 5A:
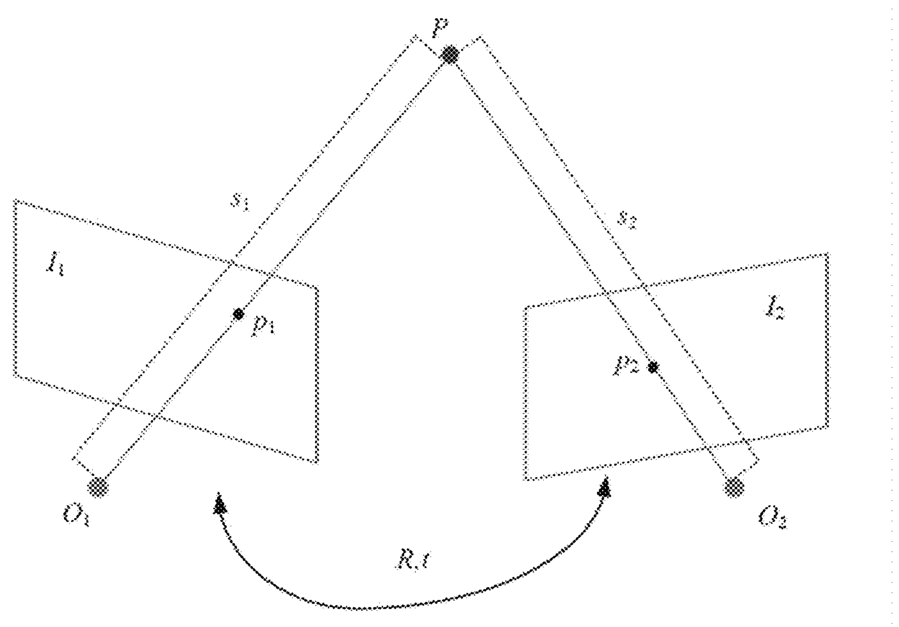
FIGS. 5A and 5B illustrate performing triangulation to estimate a 3D coupler position according to some example embodiments.
Figure 5B:
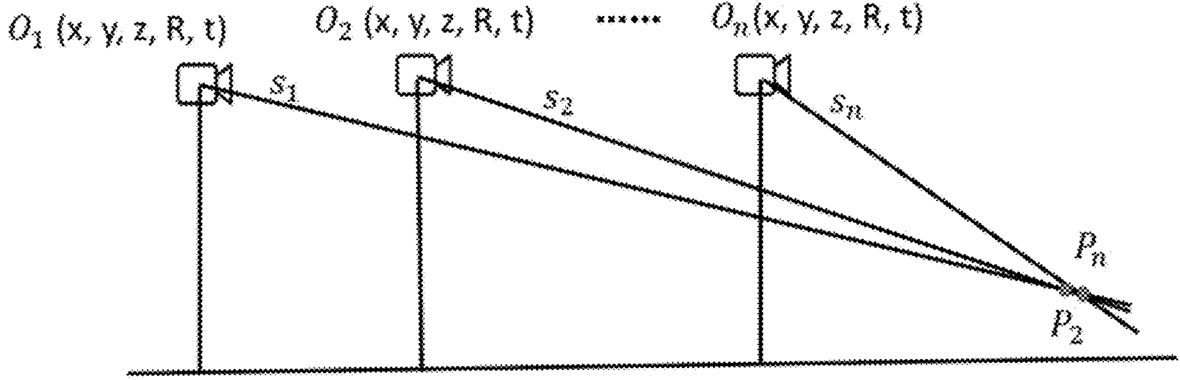

FIGS. 5A and 5B illustrate an example of performing triangulation to estimate a 3D coupler position according to some example embodiments.

Referring to FIG. 5A, the 3D coupler position P may be estimated based on the 2D coupler positions $p_1$, $p_2$ of the coupler within respective ones of the image frames $I_1$ and $I_2$.

The 3D coupler position estimator 240 may consider the first image frame $I_1$ and the second image frame $I_2$ as planes and may map the known position of the 2D coupler point $p_1$, $p_2$ within the normalized image planes. As illustrated in FIG. 5A, P is the 3D position of coupler, $I_1$ is the first image frame, $I_2$ is the second image frame, $O_1$ is the focal point of the camera at the first image frame, $O_2$ is the focal point of camera at the second image frame, $p_1$ and $p_2$ are the 2D pixel positions of coupler in first and second frame images, respectively, and t and R are the translation and rotation of camera positions between the first and second frame images. $s_1$ and $s_2$ are unknowns representing the distances from P to $O_1$ and $O_2$, respectively. $u_1$, $v_1$, and $u_2$, $v_2$ are the pixel positions in the first image frame $I_1$ and the second image frame 12, respectively, and X, Y and Z are the actual 3D position in three dimensions with respect to the camera. The 3D coupler position estimator 240 may determine the unknown distances $s_1$ and $s_2$ through triangulation as follows.

For example, the position of the 3D coupler point $p_1$ within the plane of the first image frame $I_1$, the position of the 3D coupler point $p_2$ within the plane of the second image frame $I_2$ and the estimated 3D coupler position P may be represented as $$p_1 = \begin{bmatrix} u_1 \\ v_1 \\ 1 \end{bmatrix},\ p_2 = \begin{bmatrix} u_2 \\ v_2 \\ 1 \end{bmatrix},\ \text{and } P = \begin{bmatrix} X \\ Y \\ Z \end{bmatrix} \tag{1}$$

The 3D coupler position estimator 240 may project the 3D coupler position P to image frames $I_1$ and $I_2$ to determine Equation 2:

(1)

$$Zp_1 = KP \text{ and } Zp_1 = K(RP + t) \tag{2}$$

The 3D coupler position estimator 240 may define the 2D position of coupler point in each of the normalized image planes as $x_1$ and $x_2$ as follows:

(2)

$$x_1 = \frac{1}{Z}P \text{ and } x_2 = \frac{1}{Z}(RP + t) \tag{3}$$

Certain variables in Equations 1-3 may be known. For example, the 3D coupler position estimator 240 may determine the known variables $p_1$ and $p_2$ from the 2D coupler positions, K from the input intrinsic properties of the camera, the rotation and translation R, t of the camera in 3D space.

The 3D coupler position estimator 240 may obtain Equation 4 by performing rotation R and translation t of the 2D coupler position in the normalized image planes from $I_1$ to $I_2$ as follows:

$$s_1 x_1 = s_2 R x_2 + t \tag{4}$$

In Equation 4, t and R, $x_1$ and $x_2$ are all known variables, and, thus, the 3D coupler position estimator 240 may calculate either the distance $s_1$ from the focal point $O_1$ of camera at first image frame to the 3D position of the coupler P, or may calculate the distance $s_2$ from the focal point $O_2$ of camera at second image frame to the 3D position of coupler P.

For example, to calculate the distance $s_2$ from the focal point $O_2$ of camera at second image frame to the 3D position of coupler, the 3D coupler position estimator 240 may convert Equation 4 to Equation 5 and solve for the distance $s_2$ as follows:

$$s_2 x_1^{\wedge} R x_2 + x_1{}^{\wedge} t = 0 \tag{5}$$

In Equation 5, ^ is the exterior product of two matrices. Once either the distance $s_1$ or $s_2$ are determined, the 3D coupler position estimator 240 may generate an estimate of the 3D coupler position P based on the 2D position and the determined distance.

Referring to FIG. 5B, the 3D coupler position estimator 240 may continuously perform triangulation when a new image frame is received. The new image frame and the prior frame conducts the triangulation, which is referred as image frames $I_1$ and $I_2$ in FIG. 5A.

Referring back to FIG. 3, as discussed above, in operation S350, the optimization module 250 may perform optimization on the estimated 3D coupler positions P to reduce reprojection errors therein to generate optimized 3D coupler positions P'.

Figure 6:
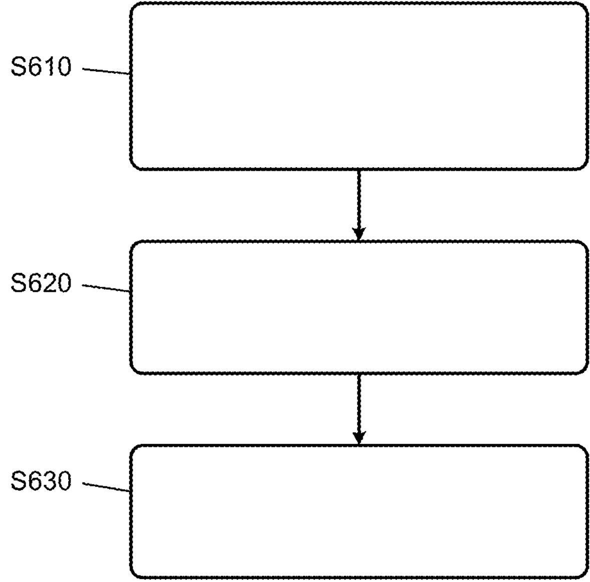
FIG. 6 illustrates a method of optimizing a 3D position of a trailer coupler according to some example embodiments.
Figure 7:
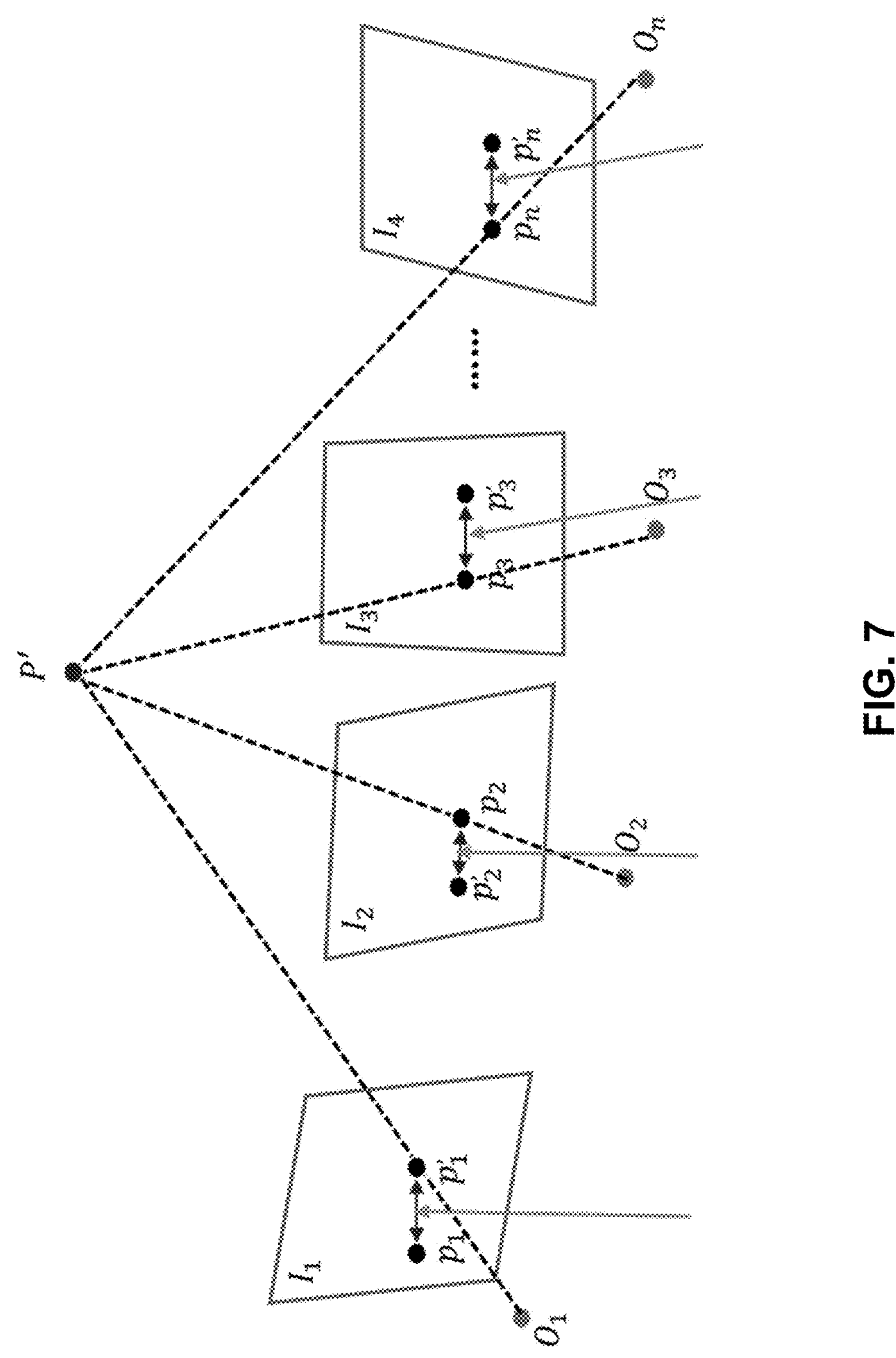
FIG. 7 illustrates an example of performing optimization of a 3D position of a trailer coupler according to some example embodiments.

FIG. 6 illustrates a method of optimizing a 3D position of a trailer coupler according to some example embodiments, and FIG. 7 illustrates an example of performing optimization of a 3D position of a trailer coupler according to some example embodiments.

Referring to FIGS. 6 and 7, in operation S610, the optimization module 250 may receive the estimated 3D coupler positions P, the first and second image frames $I_1$ and $I_2$, the 2D pixel positions of coupler positions $p_1$, $p_2$ and the rotation and translation R, t of the camera in 3D space from, for example, a buffer. The buffer may be included in a memory included in a control module of the vehicle.

In operation S620, the optimization module 250 may reproject the estimation of the 3D coupler position P back to focal points $O_1$-$O_n$ on a plurality of buffered image frames $I_1$-$I_n$, respectively, to determine $$p_1' - p_n'$$

reprojected 2D positions. The optimization module 250 may compare the determined $$p_1' - p_n'$$

reprojected 2D positions with respective ones of the stored 2D pixel positions of coupler positions $p_1$-$p_n$ determined by the coupler position estimator 230 and may calculate reprojection errors $E_1$-$E_n$ therebetween.

In operation S630, the optimization module 250 may aim to reduce (or, alternatively, minimize) a total reprojection error $E_{total}$ by adjusting the 3D coupler position P estimated by the optimization module 250, where the total reprojection error $E_{total}$ may be represented as follows:

$$E_{total} = E_1 + E_2 + E_3 + \ldots E_n \tag{6}$$

Referring back to FIG. 3, as discussed above, in operation S360, the filtering module 260 may filter the optimized 3D coupler positions P' to generate a final 3D coupler position Pf.

Figure 8:
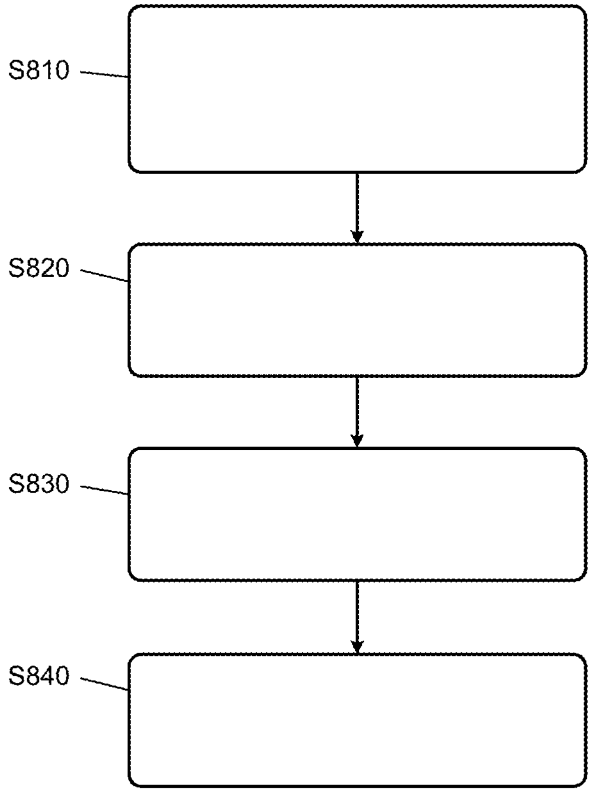
FIG. 8 illustrates an example of a method of filtering 3D coupler positions according to some example embodiments.
Figure 9:
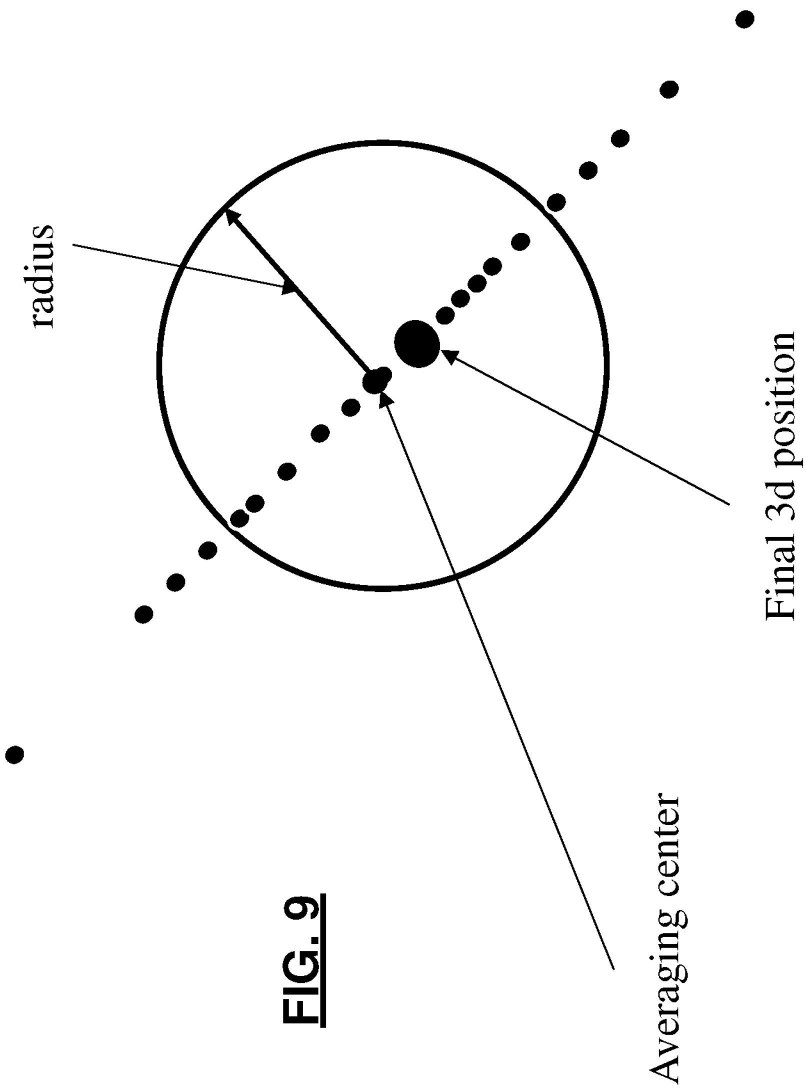
FIG. 9 illustrates an example of performing filtering of 3D positions of a trailer coupler according to some example embodiments.

FIG. 8 illustrates an example of a method of filtering 3D coupler positions according to some example embodiments, and FIG. 9 illustrates an example of performing filtering of 3D positions of a trailer coupler according to some example embodiments.

Referring to FIGS. 8 and 9, in operation S810, the filtering module 260 may receive the buffered optimized 3D positions P'.

In operation S820, the filtering module 260 may average the buffered optimized 3D coupler positions P'. The filtering module 260 may average the buffered optimized 3D coupler positions by adding the buffered optimized 3D coupler positions in three axes, and then, dividing by the total number of optimized 3D coupler positions in the buffer.

In operation S830, the filtering module 260 may remove the optimized 3D positions outside a defined radius R from the average 3D coupler position. For example, the filtering module 260 may define the radius R as one fourth of the distance between the average 3D coupler position to the outermost optimized 3D position. However, example embodiments are not limited thereto.

Thereafter, in operation S840, the filtering module 260 may average the remaining points within the defined radius R to determine the final 3D coupler Position Pf.

Referring back to FIG. 3, as discussed above, in operation S370, the hitch guidance or auto-hitching module 270 may utilize the final 3D coupler position Pf to perform one or more operations. For example, as discussed below with reference to FIG. 10, in some example embodiments, the hitch guidance or auto-hitching module 270 may guide an operator of the vehicle to approach the final 3D coupler position Pf. In other example embodiments, as discussed below with reference to FIG. 11, the hitch guidance or auto-hitching module 270 may automatically align the vehicle with the final 3D coupler position Pf.

Figure 10:
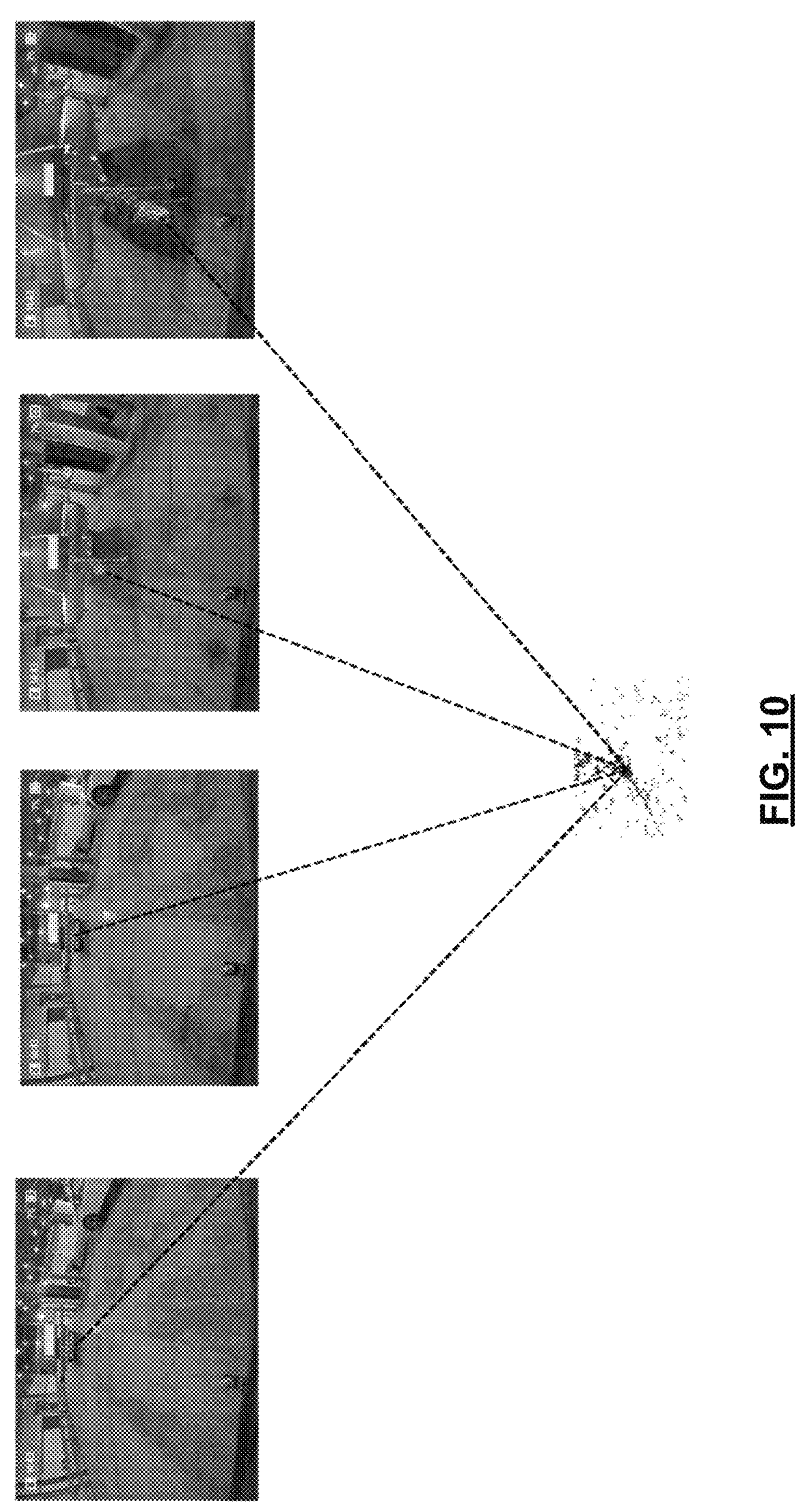
FIG. 10 illustrates experimental results of final coupler positions captured at different depths as the vehicle approaches the trailer according to some example embodiments.

FIG. 10 illustrates experimental results of final coupler positions captured at different depths as the vehicle approaches the trailer according to some example embodiments according to some example embodiments.

Referring to FIG. 10, as the vehicle approaches the trailer, the electronic device may continually determine the final 3D coupler position Pf, which may be used to determine (or alternatively, convey) changes between one or more of the depth, the height and angle between the trailer coupler and the hitch ball of the vehicle.

Figure 11:
FIG. 11 illustrates Hitch Guidance according to some example embodiments.
Figure 11:

FIG. 11 illustrates Hitch Guidance according to some example embodiments.

Referring to FIG. 11, the hitch guidance or auto-hitching module 270 may control the infotainment module 183 of the vehicle to guide an operator based on the final 3D coupler position Pf.

For example, the hitch guidance or auto-hitching module 270 may determine the location of the hitch ball on the vehicle, and may guide the operator of the vehicle to align the location of the hitch ball with the final 3D coupler position Pf using the infotainment module 183.

In some example embodiments, the hitch guidance or auto-hitching module 270 may determine the location of the hitch ball on the vehicle through a preset parameter input into the infotainment module 183 by for example, the operator, a dealer, or a factory. In other example embodiments, the hitch guidance or auto-hitching module 270 may determine the location of the hitch ball on the vehicle through recognition of the same using the camera.

In some example embodiments, the hitch guidance or auto-hitching module 270 may guide the operator of the vehicle to align the location of the hitch ball with the final 3D coupler position Pf.

In some example embodiments, the hitch guidance or auto-hitching module 270 may display, on the infotainment module 183, a visual element, such as a simple circle, at the final 3D coupler position Pf to enhance visibility. In some example embodiments, the hitch guidance or auto-hitching module 270 may also display the distance between the hitch ball and the final 3D coupler position Pf via a visual element, such as a measurement a progress bar, and/or a graphic of the vehicle and/or trailer, conveying how much further the customer needs to direct the vehicle to couple the hitch ball and the coupler at the final 3D coupler position Pf.

In some example embodiments, the hitch guidance or auto-hitching module 270 may display, on the infotainment module 183, a virtual guideline from the location of the hitch ball to the final 3D coupler position Pf. In some example embodiments, the virtual guideline from the location of the hitch ball to the final 3D coupler position Pf may change color and/or appearance when the user turns the steering wheel to the correct angle to align the same. In some example embodiments, the virtual guideline may change in length and angle such that, when the steering wheel is turned to align the vehicle at the correct angle, the virtual guideline ends at the intersection point of the coupler, as opposed to being drawn over the region of the image that contains the trailer.

In some example embodiments, the hitch guidance or auto-hitching module 270 may detect a height of the coupler of the trailer from a ground based on the 3D position of the coupler and determine whether the height of the coupler sufficiently corresponds to a height of the hitch ball of the vehicle. The hitch guidance or auto-hitching module 270 may display, on the infotainment module 183, a visual element, such as a checkmark, plain text, or graphic of the trailer coupler and hitch ball, is displayed to convey that the ball is at sufficiently low height to not collide with the trailer coupler, or trailer.

In some example embodiment, the hitch guidance or auto-hitching module 270 may output a visual element, an audio alert, and/or haptic feedback in the form of buzzing, to notify an operator that they are approach the trailer, have achieved good alignment, and/or are about to collide with the trailer.

As discussed above, in other example embodiments, rather than guide the operator, the hitch guidance or auto-hitching module 270 may automatically align the vehicle with the final 3D coupler position Pf.

Figure 12:
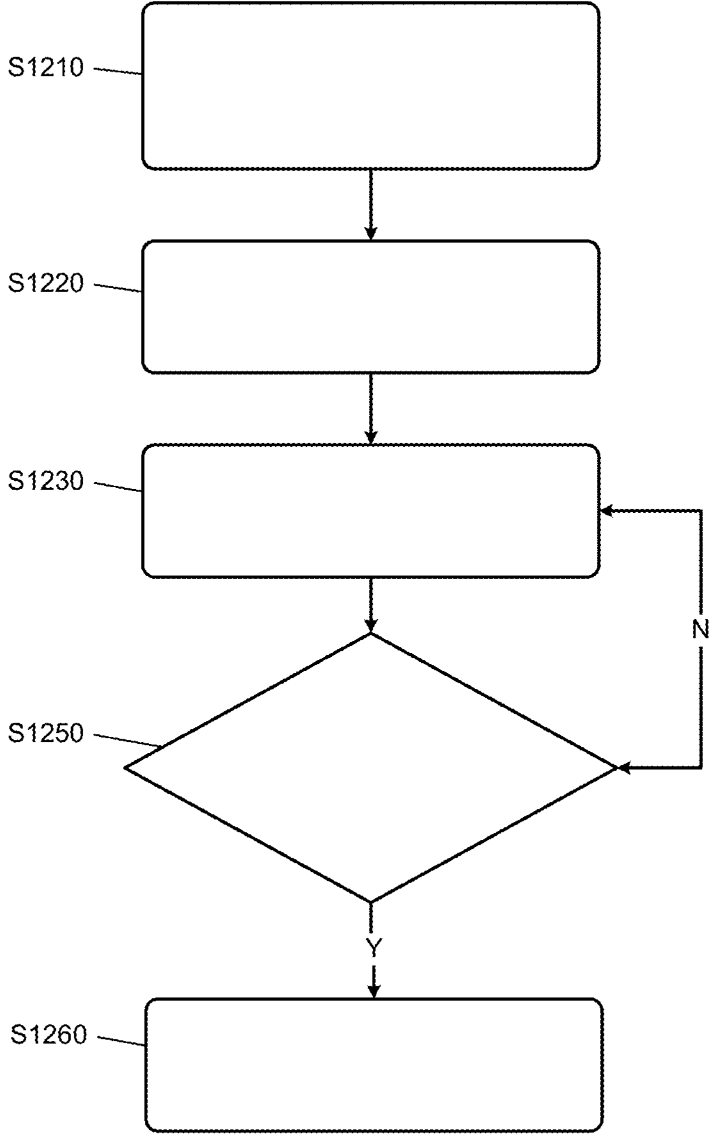
FIG. 12 illustrates a method of automatically aligning the vehicle with the final 3D coupler position according to some example embodiments.

FIG. 12 illustrates a method of automatically aligning the vehicle with the final 3D coupler position according to some example embodiments.

Referring to FIG. 12, in operation S1210, the hitch guidance or auto-hitching module 270 may receive the camera feed as well as various vehicle and camera parameters. For example, the hitch guidance or auto-hitching module 270 may receive camera intrinsic parameters and the relative position between the camera and the hitch ball on the vehicle.

In operation S1220, the hitch guidance or auto-hitching module 270 may calculate the control inputs to the vehicle control unit to control the vehicle based on the parameters.

In operation S1230, the hitch guidance or auto-hitching module 270 may deliver the calculated control inputs to a vehicle controller to instruct the vehicle controller to move the vehicle. For example, the hitch guidance or auto-hitching module 270 may deliver the calculated control inputs to one or more of the electronic control module (ECM) 106, the power inverter module (PIM) 134 and the steering control module 140. In some example embodiments, the hitch guidance or auto-hitching module 270 may control one or more of the brakes and steering as the operator manually operates the vehicle to slowly reverse the vehicle towards the coupler of the trailer. In other example embodiments, the hitch guidance or auto-hitching module 270 may also control the vehicle to automatically drive the vehicle in reverse while controlling one or more of the brakes and steering.

In operation 1240, the hitch guidance or auto-hitching module 270 may continue to monitor the relative location of the vehicle trailer hitch (or alternatively, the hitch ball) and the coupler of the trailer to determine whether the vehicle trailer hitch (or alternatively, the hitch ball) has sufficiently reached the final Coupler Position Pf.

If the hitch guidance or auto-hitching module 270 determines that the whether the vehicle trailer hitch (or alternatively, the hitch ball) has yet to sufficiently reach the final 3D coupler position Pf, the hitch guidance or auto-hitching module 270 may proceed back to operation S1230 and continue to deliver control inputs.

In operation 1260, the hitch guidance or auto-hitching module 270 may instruct one or more of the ECM 106, the PIM 134 and the steering control module 140 to stop moving the vehicle, in response to determining that the vehicle trailer hitch (or alternatively, the hitch ball) has sufficiently reached the final coupler position Pf.

As discussed above, example embodiments may detect the final 3D coupler position Pf of the coupler of the trailer, and may guide an operator of the vehicle to drive their vehicle to approach the final 3D coupler position Pf and/or may automatically align the vehicle with the final 3D coupler position Pf. Such assistance may be provided, for example, upon request and/or automatically when the vehicle is set to reverse and the coupler of the trailer is detected in an image frame captured by the rear camera of the vehicle. Therefore, example embodiment may assist an operator to couple a trailer hitch of their vehicle to the coupler of the trailer.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method of detecting and utilizing a 3-dimensional (3D) position of a coupler of a trailer, comprising:
calculating a motion of a camera mounted to a vehicle;
determining 2-dimensional (2D) positions of the coupler within input images captured by the camera;
estimating 3D estimated positions of the coupler based on the 2D positions of the coupler and the motion of the camera;
optimizing the 3D estimated positions of the coupler to generate adjusted 3D coupler positions;
filtering the adjusted 3D coupler positions to detect the 3D position of the coupler of the trailer,
wherein the optimizing comprises:
reprojecting the 3D estimated positions of the coupler back onto respective ones of the input images to determine reprojected 2D positions;
determining reprojection errors between ones of the 2-dimensional (2D) positions of the coupler within the respective ones of the input images and respective ones of the reprojected 2D positions; and
adjusting the 3D estimated positions of the coupler to reduce a sum of the reprojection errors; and
guiding the vehicle based on at least the 3D position of the coupler such that a hitch ball of the vehicle approaches the coupler of the trailer.

2. The method of claim 1, further comprising:
receiving a plurality of the input images captured by the camera; and
detecting whether the coupler is present in one or more of the plurality of the input images, wherein
the determining the 2D positions of the coupler is performed in response to detecting that the coupler is present in one or more of the plurality of the input images.

3. The method of claim 2, wherein the detecting whether the coupler is present comprises:
performing object detection on each of the plurality of the input images using trained machine learning or deep learning models.

4. The method of claim 3, further comprising:
performing supervised machine learning to generate the trained machine learning or deep learning models by iteratively applying a plurality of labeled test images having ground truth values indicating a presence of the coupler of the trailer or an absence of the coupler of the trailer to the models to reduce an error between an output of a neural network and the ground truth values of the plurality of labeled test images.

5. The method of claim 1, wherein the estimating the 3D estimated positions of the coupler comprises:
triangulating the 2D positions of the coupler in a plurality of the input images captured by the camera mounted to the vehicle to estimate the 3D estimated positions of the coupler.

6. The method of claim 5, where the triangulating comprises:
calculating a first depth value extending between one of the 3D estimated positions of the coupler and a focal point of the camera with respect to a first one of the plurality of the image images,
calculating a second depth value extending between the one of the 3D estimated positions of the coupler and a focal point of the camera with respect to a second one of the plurality of the image images, and
estimating the one of the 3D estimated positions of the coupler by performing triangulation using the first depth value and the second depth value in a 3D space.

7. The method of claim 1, wherein the filtering comprises:
averaging the adjusted 3D coupler positions to generate an average 3D coupler position;
removing ones of the adjusted 3D coupler positions outside a defined radius from the average 3D coupler position to generate remaining adjusted 3D coupler positions; and
averaging the remaining adjusted 3D coupler positions to determine a final 3D coupler position.

8. The method of claim 1, wherein the guiding comprises:
controlling a graphical user interface (GUI) to output a display to an operator of the vehicle illustrating at least a relative position between the hitch ball of the vehicle and the coupler of the trailer based on the 3D position of the coupler.

9. The method of claim 8, wherein the controlling the GUI further comprises:

adjusting one or more of an angle, a length and a color of a virtual guideline extending between the hitch ball of the vehicle and the coupler of the trailer as the relative position between the hitch ball of the vehicle and the coupler of the trailer varies.

10. The method of claim 9, wherein the guiding comprises:

detecting a height of the coupler of the trailer based on the 3D position of the coupler;

determining whether the height of the coupler corresponds to a height of the hitch ball of the vehicle; and indicating to the operator of the vehicle to adjust the height of the coupler, in response to the height of the coupler not corresponding to the height of the hitch ball of the vehicle.

11. The method of claim 1, wherein the guiding comprises:

electronically repositioning the vehicle such that the hitch ball of the vehicle approaches the coupler of the trailer based on the 3D position of the coupler.

12. The method of claim 11, wherein the electrically repositioning comprises:

controlling one or more of steering and brakes of the vehicle while the vehicle is driven in reverse towards the coupler.

13. The method of claim 12, wherein the electrically repositioning further comprises:

instructing a vehicle control system to drive the vehicle in reverse towards the coupler of the trailer based on the 3D position of the coupler while controlling the one or more of the steering and brakes of the vehicle.

14. An electronic device, comprising:

a memory; and processing circuitry configured to detect and utilize a 3-dimensional (3D) position of a coupler of a trailer by, calculating a motion of a camera mounted to a vehicle, determining 2-dimensional (2D) positions of the coupler within input images captured by the camera, estimating 3D estimated positions of the coupler based on the 2D positions of the coupler and the motion of the camera, optimizing the 3D estimated positions of the coupler to generate adjusted 3D coupler positions, filtering the adjusted 3D coupler positions to detect the 3D position of the coupler of the trailer, wherein the optimizing comprises:

reprojecting the 3D estimated positions of the coupler back onto respective ones of the input images to determine reprojected 2D positions;

determining reprojection errors between ones of the 2-dimensional (2D) positions of the coupler within the respective ones of the input images and respective ones of the reprojected 2D positions; and adjusting the 3D estimated positions of the coupler to reduce a sum of the reprojection errors, and guiding the vehicle based on at least the 3D position of the coupler such that a hitch ball of the vehicle approaches the coupler of the trailer.

15. The electronic device of claim 14, wherein the processing circuitry is configured to estimate the 3D estimated positions of the coupler by triangulating the 2D positions of the coupler in a plurality of the input images captured by the camera mounted to the vehicle to estimate the 3D estimated positions of the coupler.

16. The electronic device of claim 14, wherein the processing circuitry is configured to filter the adjusted 3D coupler positions by, averaging the adjusted 3D coupler positions to generate an average 3D coupler position, removing ones of the adjusted 3D coupler positions outside a defined radius from the average 3D coupler position to generate remaining adjusted 3D coupler positions, and averaging the remaining adjusted 3D coupler positions to determine a final 3D coupler position.

17. The electronic device of claim 14, wherein the electric device is an electronic control unit (ECU) or a vehicle control unit (VCU).

18. A vehicle comprising:

one or more processors; and memory including code that, when executed by the one or more processors, performs to detect and utilize a 3-dimensional (3D) position of a coupler of a trailer by:

calculating a motion of a camera mounted to a vehicle;

determining 2-dimensional (2D) positions of the coupler within input images captured by the camera;

estimating 3D estimated positions of the coupler based on the 2D positions of the coupler and the motion of the camera;

optimizing the 3D estimated positions of the coupler to generate adjusted 3D coupler positions;

filtering the adjusted 3D coupler positions to detect the 3D position of the coupler of the trailer, wherein the optimizing comprises:

reprojecting the 3D estimated positions of the coupler back onto respective ones of the input images to determine reprojected 2D positions;

determining reprojection errors between ones of the 2-dimensional (2D) positions of the coupler within the respective ones of the input images and respective ones of the reprojected 2D positions; and adjusting the 3D estimated positions of the coupler to reduce a sum of the reprojection errors; and guiding the vehicle based on at least the 3D position of the coupler such that a hitch ball of the vehicle approaches the coupler of the trailer.

19. The vehicle of claim 18 wherein the code, when executed by the one or more processors, further performs to:

receive a plurality of the input images captured by the camera; and detect whether the coupler is present in one or more of the plurality of the input images, wherein the determining the 2D positions of the coupler is performed in response to detecting that the coupler is present in one or more of the plurality of the input images.

20. The vehicle of claim 19, wherein the code, when executed by the one or more processors, performs to detect whether the coupler is present including performing object detection on each of the plurality of the input images using trained machine learning or deep learning models.

* * * * *